(12) United States Patent
Hamada

(10) Patent No.: US 8,147,113 B2
(45) Date of Patent: Apr. 3, 2012

(54) BACKLIGHT DEVICE AND FLAT DISPLAY USING IT

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 279 days.

(21) Appl. No.: 12/523,940

(22) PCT Filed: Sep. 6, 2007

(86) PCT No.: PCT/JP2007/067392
§ 371 (c)(1),
(2), (4) Date: Jul. 21, 2009

(87) PCT Pub. No.: WO2008/090646
PCT Pub. Date: Jul. 31, 2008

(65) Prior Publication Data
US 2010/0073959 A1 Mar. 25, 2010

(30) Foreign Application Priority Data
Jan. 22, 2007 (JP) .................................. 2007-010936

(51) Int. Cl.
*F21V 7/04* (2006.01)
(52) U.S. Cl. .................. 362/631; 362/218; 362/249.04; 362/294; 362/612

(58) Field of Classification Search .................. 362/218, 362/249.04, 294, 373, 611, 612, 631
See application file for complete search history.

(56) References Cited

U.S. PATENT DOCUMENTS 7,611,274 B2 * 11/2009 Hsiao et al. .................. 362/634
2007/0103908 A1   5/2007 Tabito et al.

FOREIGN PATENT DOCUMENTS

| JP | 2003-281924 A | 10/2003 |
| JP | 2006-11242 A | 1/2006 |
| JP | 2006-23654 A | 1/2006 |
| JP | 2006-49098 A | 2/2006 |
| JP | 2006-154136 A | 6/2006 |
| JP | 2007-12416 A | 1/2007 |

* cited by examiner

*Primary Examiner* — Stephen F Husar
(74) *Attorney, Agent, or Firm* — Birch, Stewart, Kolasch & Birch, LLP

(57) ABSTRACT

An FPC (31) on which LEDs (32) are mounted at predetermined intervals in the longitudinal direction is secured to a lower chassis (21*b*) used also as a heat-dissipating plate through an elastic heat conductive sheet (34). With a retaining plate (33) is overlapped on the mounting surface of the FPC (31), a screw (S) is inserted into the retaining plate (33) from the outside of a bezel (5) to fix the retaining plate. Furthermore, the FPC (31) is held between the retaining plate (33) and the lower chassis (21*b*).

4 Claims, 4 Drawing Sheets

BACKLIGHT DEVICE AND FLAT DISPLAY USING IT

TECHNICAL FIELD

The present invention relates to a backlight device, and more particularly to a side-lit backlight device employing a point light source.

BACKGROUND ART

In non-self-luminous display devices such as liquid crystal display devices, so called backlight devices that illuminate display panels from behind are generally provided. These backlight devices divide into a direct-lit type, a side-lit type, a planar light source type, etc., and the side-lit type is widely adopted as display devices are made slimmer and lighter.

In a side-lit backlight device, light from a light source is led into a light guide plate through a side surface thereof and is made to travel inside the light guide plate by total reflection; in addition, light is partly reflected on a reflective sheet fitted on a back surface of the light guide plate; thus light emerges through a main surface of the light guide plate to act as a planar light source, to thereby illuminate a back surface of a display panel. As light sources, cold-cathode tubes as a linear light source have conventionally been used. However, with increasing consideration to the environment these days, LEDs (light emitting diodes) as a point light source, have come to be increasingly used.

FIG. 6A is a schematic view showing how an LED is fitted in a conventional liquid crystal display device. With the liquid crystal display device shown in FIG. 6A taken up as an example, the structure of the conventional liquid crystal display device will now be described. The liquid crystal display device is provided with a backlight device 2' and a liquid crystal panel 1. In the backlight device 2', a box-shaped lower chassis 21b open at the top and bottom faces thereof is fitted with a back sheet metal 26 so as to cover the bottom-face opening; on the back sheet metal 26, a box-shaped light guide plate 22 is fitted.

On the inner wall of the lower chassis 21b that faces the side surface of the light guide plate 22, an FPC (flexible printed circuit board) 31—having a plurality of LEDs (point light sources) 32 mounted thereon in the length direction thereof—is fixed with double-faced adhesive b, with the FPC 31 housed inside a reflective case C having a square-cornered rectangular section with an opening part thereof facing the side surface of the light guide plate 22. An upper chassis 21a having an opening part formed therein to let pass light emerging from the light guide plate 22 is so fitted as to cover the top-face opening of the lower chassis 21b; by the upper chassis 21a and the lower chassis 21b, the back sheet metal 26, the reflective sheet 24, the light guide plate 22, and optical sheets 25 are held together.

On a step part 28 formed around the rim of the opening part of the upper chassis 21a of the backlight device 2', a peripheral part of the liquid crystal panel 1 is placed; a bezel 5 is placed on top, from above. Fixing the bezel 5 and the upper chassis 21a to each other completes the liquid crystal display device in which the liquid crystal panel 1 and the backlight device 2 are put together.

In the liquid crystal display device structured as described above, the FPC 31 is fitted to the reflective case C with the double-faced adhesive b. Thus, in a high temperature environment for example, the adhesive strength of the double-faced adhesive b may lower, causing the FPC 31 to come off.

For another example, as shown in FIG. 6B, conventionally, an LED 32 is mounted on a printed circuit board 51 formed of glass epoxy or the like, and this printed circuit board 51 is fixed to a lower chassis 21b with double-faced adhesive b. However, as in the example described above, the adhesive strength of the double-faced adhesive b may lower in a high temperature environment. Moreover, the thermal conductivity of the printed circuit board 51 is relatively low, and thus heat accumulates in the LED 32, causing diminished light emission efficiency and a shortened lifetime of the LED 32.

Thus, in cases where a high-power LED is used, as shown in FIG. 6C, a metal-core circuit board 52 with high thermal conductivity is used as a circuit board having an LED 32 mounted thereon, and that metal-core circuit board 52 is fitted to a lower chassis 21b with a screw S.

As described above, with the LED 32 mounted on the metal-core circuit board 52, and with this circuit board 52 screwed to the lower chassis 21b in the backlight device 2', it is possible to prevent the circuit board 52 from coming off and to prevent the LED 32 from having a shortened lifetime due to heat accumulated in the LED 32 through the circuit board 52 etc. The metal-core circuit board 52, however, is significantly expensive compared with an FPC or the like when used as a circuit board.

In a backlight device disclosed in Patent Document 1, a circuit board having an LED mounted thereon is fixed to a heat dissipation plate with fitting screws; when the circuit board is a flexible one, such as an FPC, the circuit board warps in a high temperature environment, decreasing the area of contact with the heat dissipation plate. When the area where the circuit board and the heat dissipation plate are in contact with each other is decreased, the heat generated in the LED is not adequately dissipated, possibly leading to diminished light emission efficiency and a shortened lifetime of the LED.

Patent Document 1: JP-A-2006-49098 Publication (paragraph number 0089, FIG. 5, etc.)
Patent Document 2: JP-A-2003-281924 Publication
Patent Document 3: JP-A-2006-11242 Publication

DISCLOSURE OF THE INVENTION

Problems to be Solved by the Invention

The present invention has been devised in view of the conventional problems described above, and an object of the invention is to provide a backlight device in which a circuit board does not come off, and that offers a long lifetime and in addition is inexpensive.

Another object of the invention is to provide an inexpensive planar display device that offers enhanced image display quality stably.

Means for Solving the Problem

The present invention provides a backlight device that includes a light guide plate and a point light source mounted on a flexible printed circuit board disposed near a side surface of the light guide plate. In this backlight device, the flexible printed circuit board is held between a heat dissipation plate and a retaining plate.

From the viewpoint of achieving efficient heat conduction from the flexible printed circuit board to the heat dissipation plate, it is preferable that, between the flexible printed circuit board and the heat dissipation plate, an elastic heat conductive member be interposed.

From the viewpoints of reducing the number of components, facilitating assembly, etc., it is possible to make a frame body enclosing the light guide plate serve also as a heat dissipation plate. Moreover, the retaining plate may be formed integral with the frame body enclosing the light guide plate.

The frame body enclosing the light guide plate may be composed of a plurality of separate bodies, and, of the plurality of separate bodies, one separate body may serve also as a heat dissipation plate, and the other separate body may serve also as a retaining plate.

A planar display device that includes a backlight device as described above and a display panel receiving the light emitted from the backlight device can also be said to be within the scope of the present invention. That is, in a planar display device including a display panel and a backlight device fitted on the back surface side of the display panel, when a backlight device as described above is employed, that planar display device can be said to be within the scope of the present invention.

Advantages of the Invention

Since the backlight device according to the present invention uses a flexible printed circuit board as a circuit board, it is inexpensive compared with one that uses a metal-core circuit board. Moreover, since the flexible printed circuit board is held between the heat dissipation plate and the retaining plate, it is possible to surely prevent the flexible printed circuit board from coming off or from warping even in a high temperature environment. Furthermore, since the heat generated in a point light source is efficiently dissipated into the air through the flexible printed circuit board and the heat dissipation plate, it is possible to prevent diminished light emission efficiency of the point light source and thus to obtain a long lifetime.

Interposing the elastic heat conductive member between the flexible printed circuit board and the heat dissipation plate makes it possible to achieve more efficient heat conduction from the flexible printed circuit board to the heat dissipation plate.

Making the frame body enclosing the light guide plate serve also as a heat dissipation plate, or forming the retaining plate integral with the frame body enclosing the light guide plate makes it possible to reduce the number of components and to facilitate assembly.

Forming a through hole or a notch portion in the retaining plate so that the point light source is exposed makes it possible to surely hold the flexible printed circuit board and also to facilitate assembly.

In a planar display device according to the present invention, since a backlight device as described above is employed, it is possible to obtain enhanced image display quality stably at low cost.

LIST OF REFERENCE SYMBOLS

1 Liquid crystal panel (display panel)
2 Backlight device
21a Upper chassis (frame body)
21b Lower chassis (heat dissipation plate, frame body)
22 Light guide plate
31 FPC (flexible printed circuit board)
32 LED (point light source)
33 Retaining plate
34 Heat conductive sheet (heat conductive member)
35 Through holes
211 Retaining portion (retaining member)
212 Notch portions

BEST MODE FOR CARRYING OUT THE INVENTION

A backlight device and a liquid crystal display device (planar display device) will now be described with reference to the accompanying drawings. It is to be understood, however, that these embodiments are not meant to limit the present invention in any way.

Figure 1:
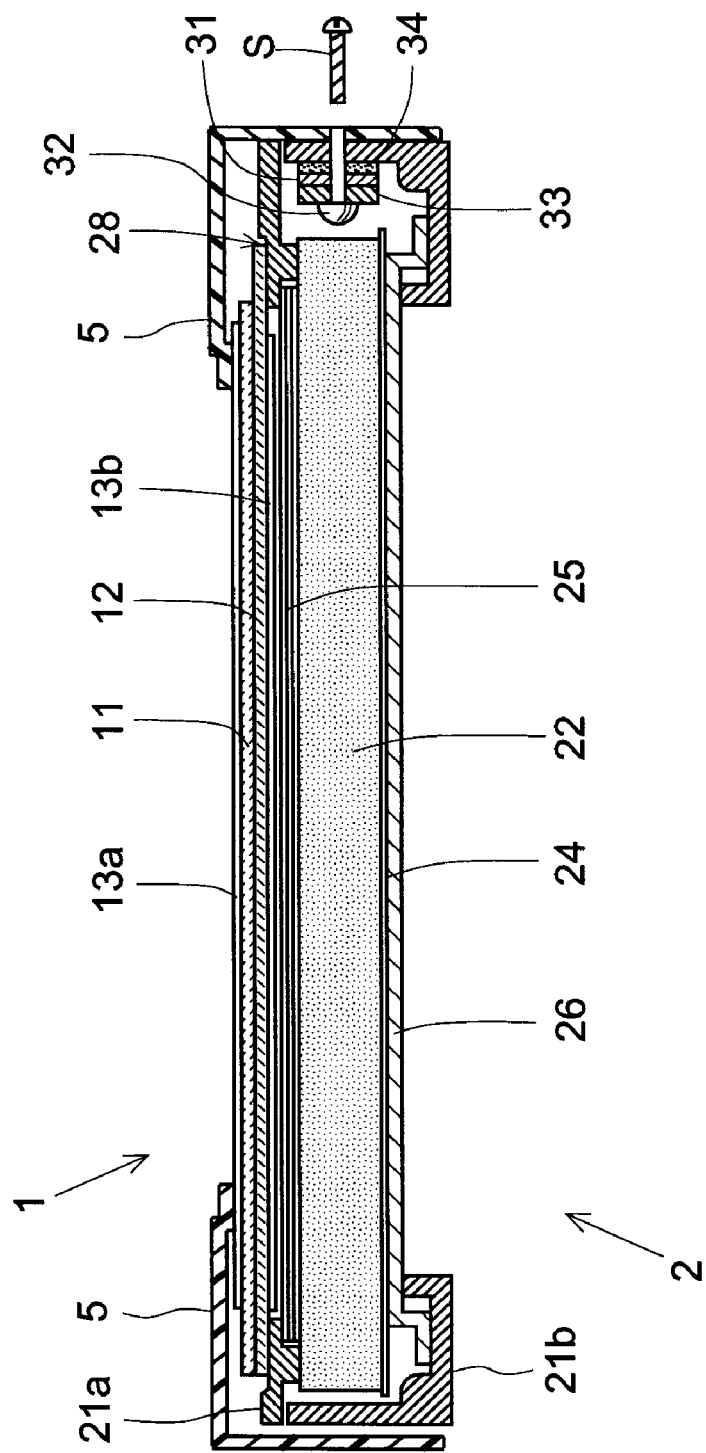
[FIG. 1] A schematic sectional view showing a liquid crystal display device as an example.

FIG. 1 is a sectional schematic view showing an example of a liquid crystal display device (planar display device) and a backlight device. The liquid crystal display device shown in FIG. 1 includes a backlight device 2 and a liquid crystal panel 1. In the backlight device 2, a box-shaped lower chassis (frame body) 21b open at the top and bottom faces thereof is fitted with a back sheet metal 26 so as to cover the bottom-face opening; above it, a box-shaped light guide plate 22 is fitted.

On the reverse surface of the light guide plate 22, a reflective sheet 24 is fitted; on the obverse surface of the light guide plate 22, three optical sheets 25 are fitted. On the inner wall of the lower chassis 21b that faces the side surface of the light guide plate 22, an FPC (flexible printed circuit board) 31—having a plurality of LEDs (point light sources) 32 mounted thereon at a predetermined interval in the length direction thereof—is provided. How the FPC 31 is fitted will be described later.

An upper chassis (frame body) 21a having an opening part formed therein to let pass light emerging from the light guide plate 22 is so fitted as to cover the top-face opening of the lower chassis 21b; by the upper chassis 21a and the lower chassis 21b, the back sheet metal 26, the reflective sheet 24, the light guide plate 22, and the optical sheets 25 are held together.

On the other hand, in the liquid crystal panel 1, liquid crystal (unillustrated) is sealed in between a pair of glass substrates 11 and 12 disposed apart from and opposite each other. An outer edge part of the glass substrate 12 extends outward beyond the glass substrate 11 and, on this extended part, a large number of electrode terminals (unillustrated) that apply voltages to pixel electrodes formed on the surface of the glass substrate 12 are formed. On the obverse and reverse surfaces of the liquid crystal panel 1, polarizing plates 13a and 13b are fitted respectively.

On a step part 28 formed around the rim of the opening part of the upper chassis 21a of the backlight device 2, a peripheral part of the liquid crystal panel 1 is placed; a bezel 5 it is placed on top, from above. Fixing the bezel 5 and the upper and lower chassis 21a and 21b to each other completes the liquid crystal display device in which the liquid crystal panel 1 and the backlight device 2 are put together.

Figure 2:
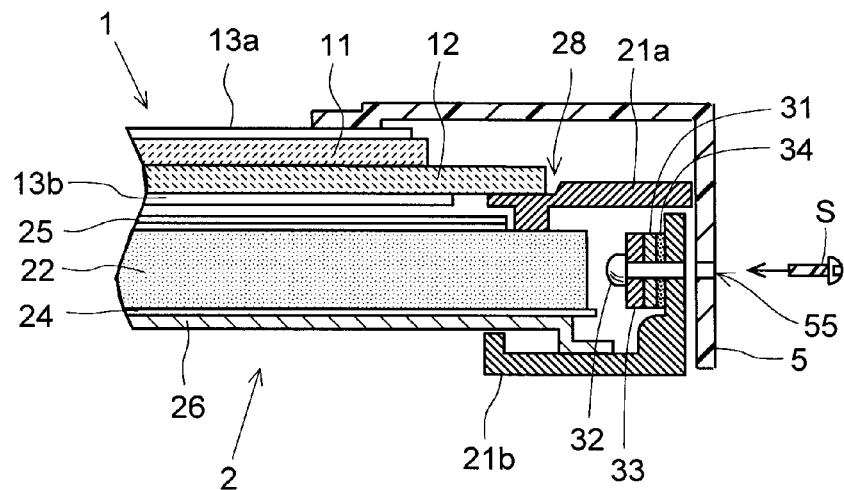
[FIG. 2] An enlarged sectional view of a light source portion in FIG. 1.
Figure 3:
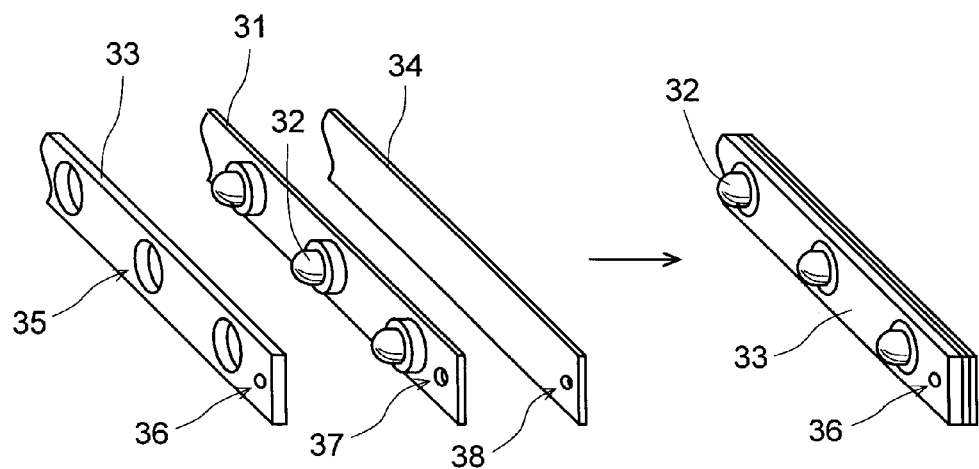
[FIG. 3] A perspective view illustrating how an FPC, a retaining plate, and a heat conductive sheet are fitted.

FIG. 2 is an enlarged view of the part, where the FPC 31 is fitted, of the liquid crystal display device structured as described above. FIG. 3 is a perspective view showing how the FPC 31 is held in place. As shown in FIG. 3, a plurality of LEDs 32 are mounted at a predetermined interval along the length direction of the FPC 31. This FPC 31 is fitted to the lower chassis 21b, which serves also as a heat dissipation plate, with an elastic heat conductive sheet (heat conductive member) 34 interposed; further, a retaining plate 33 is laid over the mounting surface of the FPC 31.

At least opposite end parts of the retaining plate 33 in the length direction are fixed with screws S that are screwed in from outside the bezel 5, so that the FPC 31 is held between the retaining plate 33 and the lower chassis 21b. This prevents the FPC 31 from inconveniently coming off from the lower chassis 21b even if the backlight device 2 is used in a high temperature environment or used for a long period of time.

As is understood from FIG. 3, in the retaining plate 33, through holes 35 are formed in positions corresponding to the LEDs 32 mounted on the FPC 31, so that the LEDs 32 fit in those through holes 35 when the retaining plate 33 is laid over the FPC 31; thus the light emitted from the LEDs 32 is not blocked by the retaining plate 33. Needless to say, it is also possible to form, instead of the through holes 35, notches in the retaining plate 33 to achieve a similar effect.

In an end part of the bezel (shown in FIG. 2) 5, of the heat conductive sheet 34, and of the FPC 31, a through hole 55, a through hole 38, and a through hole 37, respectively, are formed on a single axis; in an end part of the retaining plate 33, a through hole 36 having an internal thread formed on its inner circumferential surface is formed on the axis just mentioned. A screw S is inserted from outside the bezel 5 through the through holes to fit into the through hole 36 in the retaining plate 33, so that the retaining plate 33, the FPC 31, and the heat conductive sheet 34 are fixed to the lower chassis 21b, and in addition the lower chassis 21b and the bezel 5 are fixed together. Needless to say, it is also possible to insert a screw from outside the lower chassis 21b, so that the retaining plate 33, the FPC 31, and the heat conductive sheet 34 are fixed to the lower chassis 21b.

When the FPC 31 and the lower chassis 21b can make contact with each other without a gap, there is no need to interpose the heat conductive sheet 34 between them. In other words, when the FPC 31 and the lower chassis 21b are in direct contact with each other and a large number of small gaps are created between them due to the flexibility of the FPC 31, preventing the creation of such gaps allows quick heat conduction from the FPC 31 to the lower chassis 21b; thus, it is preferable that an elastic heat conductive sheet 34 be interposed between them. As the heat conductive sheet 34, any conventionally known one may be used so long as it is elastic. Note that it is preferable that the heat conductivity of the heat conductive sheet 34 be 1 W/m·K or more. In addition, from the viewpoint of easy assembly etc., it is preferable that the heat conductive sheet 34 be adhesive.

When the backlight device 2 is assembled, fitting of the LED 32 structured as described above proceeds as follows. For example, the structure shown in FIG. 3, having the retaining member 33, the FPC 31, and the heat conductive sheet 34 laid together, is inserted into the backlight device in the state shown in FIG. 2, in which the upper chassis 21a and the lower chassis 21b are fitted together, the insertion taking place from a side of the backlight device (in a direction perpendicular to the plane of the figure) along a side wall of the lower chassis 21b up to a predetermined position, followed by the former being screwed.

Figure 4:
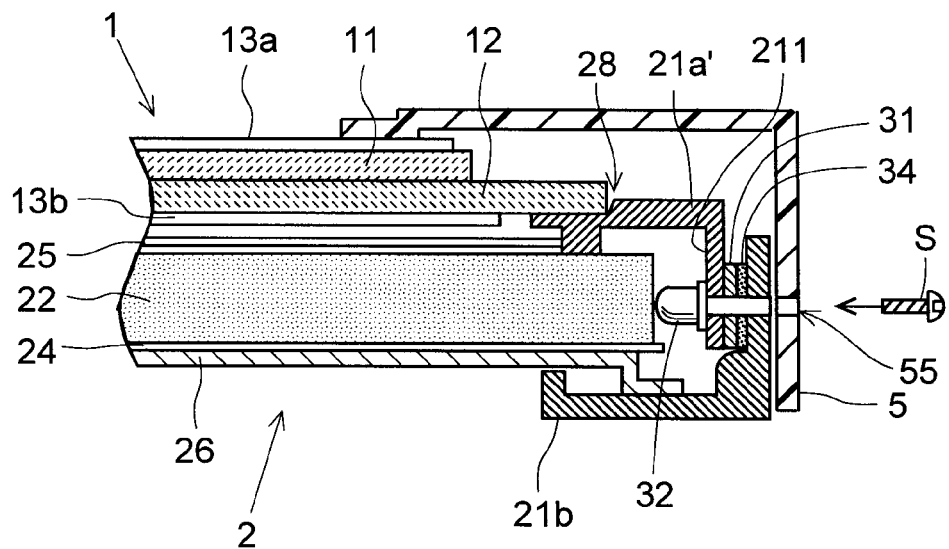
[FIG. 4] An enlarged sectional view showing part of a liquid crystal display device as another example.

FIG. 4 is a sectional view showing part of a backlight device according to another embodiment. Compared with the backlight device according to the above-described embodiment shown in FIG. 2, that shown in FIG. 4 differs in that, in a part of an upper chassis 21a', a part (retaining portion 211) serving as a retaining member is formed integrally. Specifically, the upper chassis 21a' has a side wall hanging down from a side end thereof to form the retaining portion 211.

Thus the chassis 21 enclosing the light guide plate 22 divides into the upper chassis (a separate body) 21a' and the lower chassis (a separate body) 21b; of the upper chassis 21a' and the lower chassis 21b, one, the lower chassis 21b, serves also as a heat dissipation plate and the other, the upper chassis 21a', serves also as a retaining plate.

With this structure, there is no need to fabricate the retaining plate as a separate member; thus, it is possible to reduce the number of components and in addition to enhance productivity.

Figure 5:
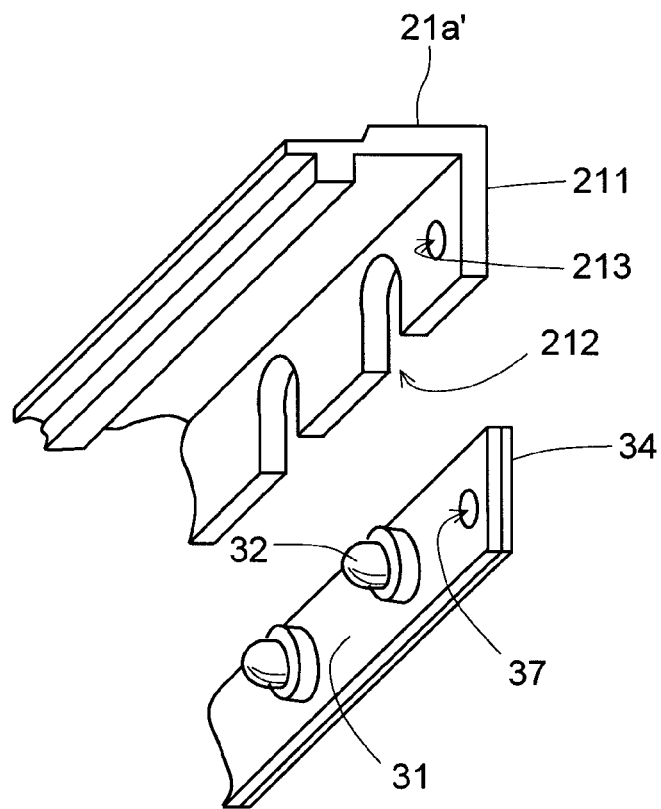
[FIG. 5] A perspective view illustrating how the FPC is fitted to a retaining portion.
Figure 6A:
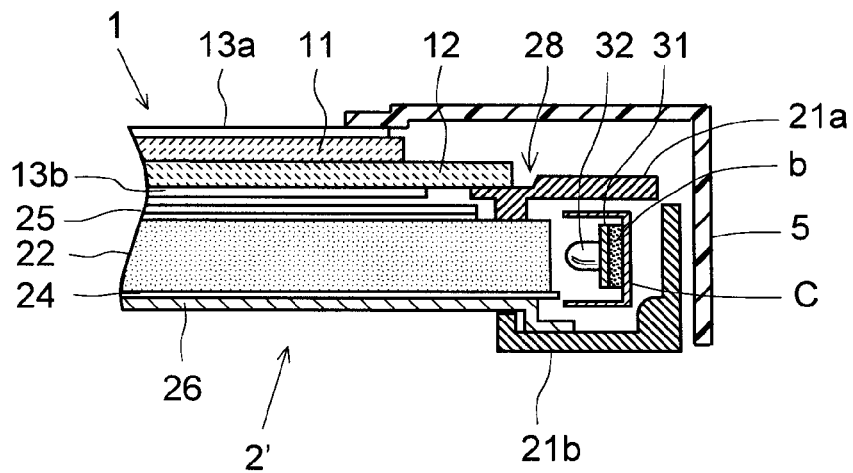
[FIG. 6A] An example of a partial sectional view showing how a light source is fitted in a conventional backlight device.
Figure 6B:
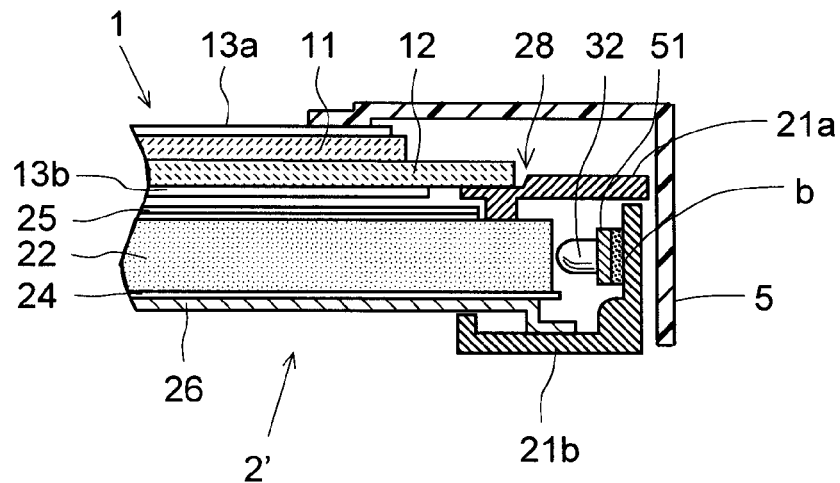
[FIG. 6B] An example of a partial sectional view showing how a light source is fitted in a conventional backlight device different from that shown in FIG. 6A.
Figure 6C:
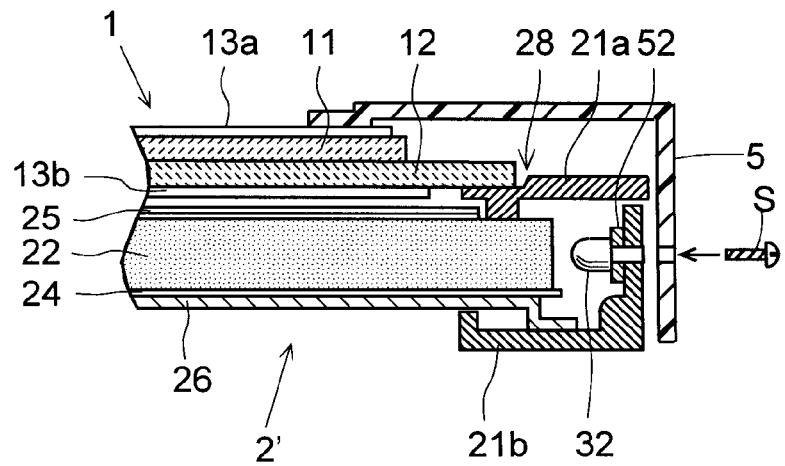
[FIG. 6C] An example of a partial sectional view showing how a light source is fitted in a conventional backlight device different from those shown in FIGS. 6A and 6B.

FIG. 5 is an enlarged perspective view showing part of the retaining portion 211. As shown in FIG. 5, the retaining portion 211 extends from a side end of the upper chassis 21a' vertically downward. In the bottom end surface of the retaining portion 211, at positions corresponding to the mounting interval of the LED 32, notch portions 212 are formed from the bottom end thereof up.

Further, such that the LEDs 32 mounted on the FPC 31 fit into those notch portions 212, the FPC 31 having the heat conductive sheet 34 fitted thereto is fitted to the upper chassis 21a'. Then, as shown in FIG. 4, the lower chassis 21b serving as a heat dissipation plate is combined with the heat conductive sheet 34 such that they make surface contact with each other, and the bezel 5 is placed on, further outside.

From outside the bezel 5, a screw S is inserted through the through hole 37 to fit into the through hole 213 in the retaining portion 211, so that the retaining portion 211 of the upper chassis 21a', the FPC 31, the heat conductive sheet 34, the lower chassis 21b, and the bezel 5 are fixed together. Needless to say, it is also possible to insert a screw from outside the lower chassis 21b, so that the retaining portion 211 of the upper chassis 21a', the FPC 31, and the heat conductive sheet 34 are fixed to the lower chassis 21b.

The invention claimed is:

1. A backlight device comprising:
   a light guide plate; and
   a light source mounted on a flexible printed circuit board disposed near a side surface of the light guide plate,
   wherein
   the light guide plate is held between a box-shaped lower chassis open at a top and an upper chassis having an opening part formed therein to let pass light emerging from the light guide plate, and
   the flexible printed circuit board is held between a retaining plate, which is a side wall extending perpendicularly down from a side end of the upper chassis, and a heat dissipation plate, which is a side wall extending perpendicularly up from a side end of the lower chassis.

2. The backlight device according to claim 1,
   wherein, between the flexible printed circuit board and the heat dissipation plate an elastic heat conductive member is interposed.

3. The backlight device according to claim 1,
   wherein, in the retaining plate, a through hole or a notch portion is formed so as to expose a point light source.

4. A planar display device comprising a display panel and a backlight device fitted on a back surface of the display panel, wherein the backlight device is the backlight device according to claim 1.

* * * * *